United States Patent
Åhlander et al.

(10) Patent No.: US 9,374,724 B2
(45) Date of Patent: Jun. 21, 2016

(54) CHANNEL ESTIMATION USING REFERENCE SIGNALS

(75) Inventors: Mats Åhlander, Täby (SE); David Sandberg, Solna (SE); Fredrik Huss, Sundbyberg (SE); Pontus Arvidsson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/355,539

(22) PCT Filed: Nov. 3, 2011

(86) PCT No.: PCT/SE2011/051314
§ 371 (c)(1),
(2), (4) Date: Apr. 30, 2014

(87) PCT Pub. No.: WO2013/066224
PCT Pub. Date: May 10, 2013

(65) Prior Publication Data
US 2014/0254421 A1    Sep. 11, 2014

(51) Int. Cl.
H04W 72/12    (2009.01)
H04W 24/06    (2009.01)
H04L 25/02    (2006.01)

(52) U.S. Cl.
CPC ........... *H04W 24/06* (2013.01); *H04L 25/0202* (2013.01); *H04L 25/0224* (2013.01); *H04W 72/1226* (2013.01)

(58) Field of Classification Search
CPC . H04W 24/06; H04W 72/0453; H04W 24/00; H04W 72/12; H04W 72/1226; H04B 7/0421; H04B 7/21; H04B 7/0697; H04B 7/0854; H04L 1/0001; H04L 1/0003; H04L 1/0017; H04L 25/022; H04L 25/0222–25/0258; H04L 43/08; H04L 5/0048–5/0051; H04L 27/2647; H04L 25/0202

USPC ......... 370/252, 241, 338, 330, 329, 328, 400, 370/345, 343, 336, 278; 455/507, 450, 455/422.1, 67.11, 509, 501, 115.1; 375/260
See application file for complete search history.

(56) References Cited

U.S. PATENT DOCUMENTS

| 2005/0128953 A1 | 6/2005 | Wallace et al. |
| 2005/0135509 A1* | 6/2005 | Mantravadi ......... H04L 25/0218 375/340 |

(Continued)

FOREIGN PATENT DOCUMENTS

| EP | 2 408 131 A1 | 1/2012 |
| WO | WO 2010/055420 A2 | 5/2010 |

(Continued)

OTHER PUBLICATIONS

International Search Report, PCT Application No. PCT/SE2011/051314, Jul. 27, 2012.
Written Opinion of the International Searching Authority, PCT Application No. PCT/SE2011/051314, Jul. 27, 2012.

*Primary Examiner* — Edan Orgad
*Assistant Examiner* — Ivan O Latorre
(74) *Attorney, Agent, or Firm* — Patent Portfolio Builders, PLLC

(57) ABSTRACT

A method in a radio network node for estimating channel gain over frequencies of a bandwidth in a radio communications network. The radio network node measures a first channel gain based on a received power of a sounding reference signal over a first set of frequencies from a user equipment, which first set of frequencies is comprised in the frequencies of the bandwidth. Furthermore, the radio network node measures a second channel gain based on a received power of a received demodulation reference signal of a physical uplink shared channel over a second set of frequencies from the user equipment, which second set of frequencies is comprised in the frequencies of the bandwidth. The radio network node then estimates a third channel gain over the frequencies of the bandwidth based on the measured first channel gain and the measured second channel gain.

12 Claims, 11 Drawing Sheets

(56) References Cited

U.S. PATENT DOCUMENTS

| | | | |
|---|---|---|---|
| 2006/0222094 A1* | 10/2006 | Makhlouf et al. | 375/260 |
| 2006/0233268 A1* | 10/2006 | Frank et al. | 375/260 |
| 2008/0219360 A1* | 9/2008 | Hekmann et al. | 375/260 |
| 2009/0141819 A1* | 6/2009 | Hojen-Sorensen et al. | 375/260 |
| 2009/0202008 A1* | 8/2009 | Suzuki | 375/260 |
| 2009/0262695 A1* | 10/2009 | Chen | H04L 5/0053 370/329 |
| 2010/0238883 A1* | 9/2010 | Borran et al. | 370/329 |
| 2010/0246527 A1* | 9/2010 | Montojo et al. | 370/330 |
| 2010/0246561 A1* | 9/2010 | Shin | H04W 52/32 370/345 |
| 2010/0298016 A1* | 11/2010 | Madan et al. | 455/501 |
| 2011/0194700 A1* | 8/2011 | Hetherington et al. | 381/17 |
| 2012/0009959 A1* | 1/2012 | Yamada | H04B 7/0413 455/507 |
| 2012/0057543 A1* | 3/2012 | Yokomura | H04L 25/0228 370/329 |
| 2013/0028128 A1* | 1/2013 | Novak et al. | 370/252 |
| 2013/0028226 A1* | 1/2013 | Nakamura et al. | 370/329 |

FOREIGN PATENT DOCUMENTS

| | | | | |
|---|---|---|---|---|
| WO | WO 2010/064110 | * | 6/2010 | H04W 52/26 |
| WO | WO 2010/101172 | * | 9/2010 | H04L 27/01 |
| WO | WO 2010/103886 A1 | | 9/2010 | |

* cited by examiner

CHANNEL ESTIMATION USING REFERENCE SIGNALS

CROSS REFERENCE TO RELATED APPLICATION

This application is a 35 U.S.C. §371 national stage application of PCT International Application No. PCT/SE2011/051314, filed on 3 Nov. 2011, the disclosure and content of which is incorporated by reference herein in its entirety. The above-referenced PCT International Application was published in the English language as International Publication No. WO 2013/066224 A1 on 10 May 2013.

TECHNICAL FIELD

A radio network node and a method therein, in particular, for estimating channel gain over frequencies in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In the LTE uplink a Sounding Reference Signal (SRS) is a type of reference signals that has been incorporated into an Evolved Universal Terrestrial Radio Access (E-UTRA) standard of a Third Generation Partnership Project (3GPP). The SRS may be used for many different purposes such as estimation of a time-of-arrival and a frequency offset; calculation of beam-forming weights in the downlink; power control in the uplink; and for Frequency Selective Scheduling (FSS) and Frequency Selective Link Adaptation (FSLA) in the uplink.

SRS may be configured to be transmitted in a single transmission over the total system bandwidth or be split into several, more narrow band SRS transmissions e.g. 4 Physical Resource Blocks. Each PRB may comprise 12 subcarriers of 15 kHz equating to 180 kHz of spectrum. The total system bandwidth is then covered through the utilization of frequency hopping, wherein SRSs of subframes are spread in frequency relative one another covering the total system bandwidth of frequencies.

Existing known technologies use SRS standalone as the basis for estimating a channel gain input to FSS and FSLA. Channel gain is measured by measuring received signal power given the transmit power, and depends on pathloss, antenna gain and feeder loss etc. For this to work well, SRS has to be transmitted quite frequently both in the time and frequency domain in order for the scheduling to be able to follow the time and frequency variations of the radio channel. The LTE standard allows the time transmission intervals (TTI) to be configured per UE, which can independently be set to a periodicity of 2, 5, 10, 20, 40, 80, 160 and 320 ms. By using the most frequent SRS transmission setting of 2 ms a very good resolution in the time domain can be achieved. Transmitting SRS this frequently will however consume a lot of SRS resources for a single UE and also introduce a lot of interference on the SRS channel that will impact the accuracy of the SRS. Therefore there is a trade-off between the number of configured SRS UEs that can be supported and the amount of time resolution that can be achieved.

Furthermore existing technologies rely on updating the channel gain estimation vector on those frequencies where a SRS transmission has been received. This is done by overwriting old channel gain measurements with the new channel gain measurements. The drawback of using the overwriting approach is that during frequency hopping schemes it may take a very long time before each frequency is updated. If for example SRS is transmitted every 5th ms and a 4-PRB wide SRS is transmitted it will then take 120 ms between updates for 20 MHz bandwidth covering 96 PRBs. This makes the channel gain estimation quite unreliable even for slowly varying radio channel conditions. If the channel is varying fast enough each new SRS update will appear as noise in the scheduler.

As mentioned earlier SRS can be configured to be transmitted at different bandwidths, and in its simplest form the SRS is transmitted over the full system bandwidth in one single transmission. The drawback with the full bandwidth approach is that the available power in the UE will then have to be distributed over many frequencies or subcarriers. If the SRS transmissions are split into several narrower SRS transmissions, the available power can be distributed over fewer subcarriers, thereby improving the SRS coverage. On a 20 MHz LTE system a 6 dB gain in link coverage is achieved by using 24PRB SRS and frequency hopping compared to using SRS transmissions over the full bandwidth. If a 4-PRB wide SRS is chosen a 13.8 dB gain in link coverage may be achieved compared to a full bandwidth configuration. By utilizing SRS transmissions over narrower band and frequency hopping the link budget for the SRS channel, which link budget defines available resources for the SRS channel may be significantly improved. This is important since FSS and FSLA then may be used as a feature for improving the coverage and thereby also the throughput at the cell edge. Hence, a solution for maximizing the uplink coverage, narrow band SRS together with frequency hopping may be employed. However, as mentioned above, problems when using SRS transmissions of narrower band and frequency hopping are that repeatedly sent SRSs consumes a lot of radio resources and that updated SRS measurements cannot keep up with varying conditions of the channel.

SUMMARY

An object of embodiments herein is to provide a channel gain estimation that is accurate and efficiently established.

According to an aspect the object is achieved by a method in a radio network node for estimating channel gain over frequencies of a bandwidth in a radio communications network. The radio network node serves a user equipment in the radio communications network. According to embodiments herein the radio network node measures a first channel gain based on a received power of a sounding reference signal over a first set of frequencies from the user equipment. The first set of frequencies is comprised in the frequencies of the bandwidth. Furthermore, the radio network node measures a second channel gain based on a received power of a received demodulation reference signal of a physical uplink shared channel over a second set of frequencies from the user equipment. The second set of frequencies is comprised in the frequencies of the bandwidth. The radio network node then estimates a third channel gain over the frequencies of the bandwidth based on the measured first channel gain and the measured second channel gain.

According to another aspect the object is achieved by a radio network node for estimating channel gain over frequencies of a bandwidth in a radio communications network. The radio network node is arranged to serve a user equipment in the radio communications network. The radio network node comprises a measuring circuit configured to measure a first channel gain based on a received power of a sounding reference signal over a first set of frequencies from the user equipment. The measuring circuit is further configured to measure a second channel gain based on a received power of a received demodulation reference signal of a physical uplink shared channel over a second set of frequencies from the user equipment. The first set of frequencies and second set of frequencies are comprised in the frequencies of the bandwidth in the radio communications network. The radio network node further comprises an estimating circuit configured to estimate a third channel gain over the frequencies of the bandwidth based on the measured first channel gain and the measured second channel gain.

An advantage of embodiments herein is that both the frequency and time variations of the channel gain are caught accurately which enables to significantly increase benefits of embodiments herein by utilizing the estimated third channel gain when e.g. performing FSS and Frequency Selective Link Adaptation (FSLA). Embodiments herein present a solution which gives both a good time resolution of the estimated third channel gain, without compromising on the capacity in terms of number of SRS user equipments.

BRIEF DESCRIPTION OF THE DRAWINGS

Embodiments will now be described in more detail in relation to the enclosed drawings, in which.

DETAILED DESCRIPTION

Figure 1:
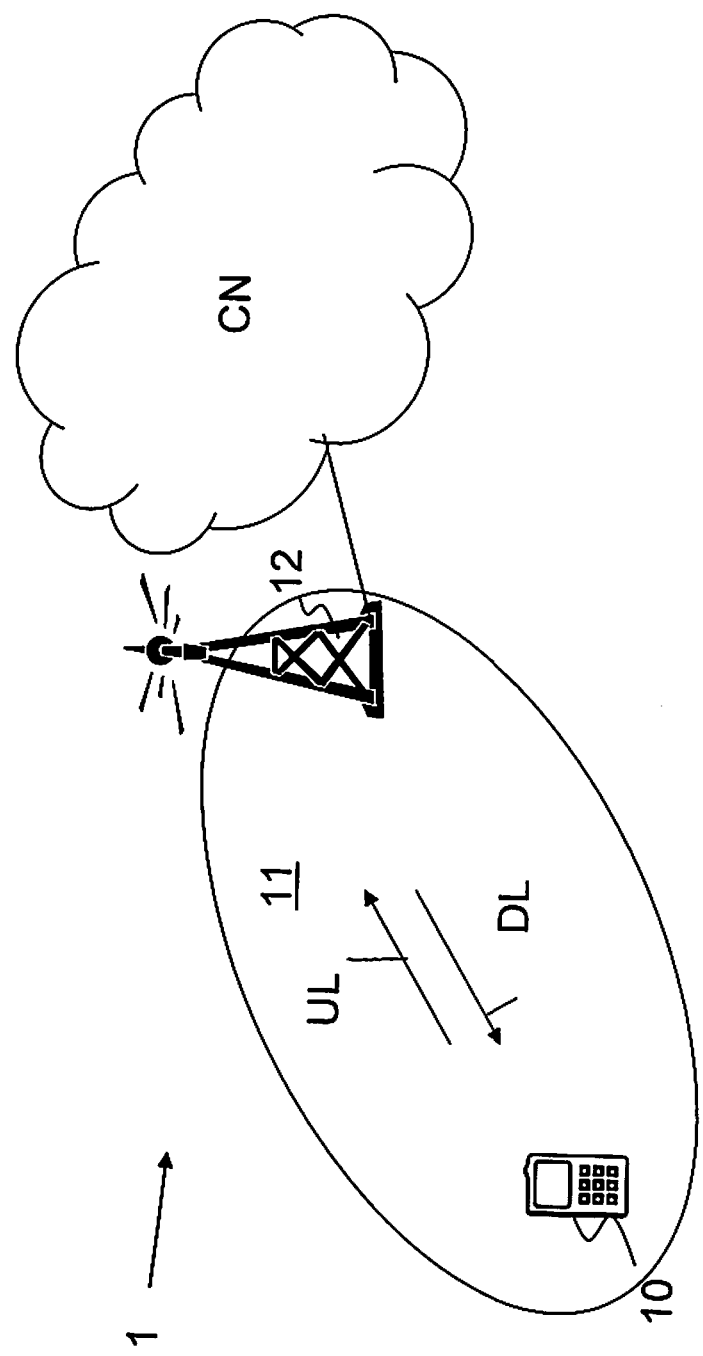
FIG. 1 is a schematic overview depicting embodiments of a radio communications network.

FIG. 1 is a schematic overview depicting embodiments in a radio communications network 1. The radio communications network 1 may use a number of different technologies, such as LTE, LTE-Advanced, WCDMA, GSM/EDGE, WiMax, or UMB, just to mention a few possible implementations. The radio communications network 1 comprises a radio network node 12 providing radio coverage over at least one geographical area forming a cell 11. The cell definition may also incorporate frequency bands used for transmissions, which means that two different cells may cover the same geographical area but using different frequency bands. A user equipment (UE) 10 is served in the cell 11 by the radio network node 12 and is communicating with the radio network node 12. The user equipment 10 transmits data over a radio interface to the radio network node 12 in UL transmissions and the radio network node 12 transmits data over a radio interface to the user equipment 10 in DL transmissions. The radio network node 12 is connected to a core network (CN).

It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within the cell 11.

The radio network node 12 may also be referred to as e.g. a radio base station, a NodeB, an evolved Node B (eNB, eNode B), a base transceiver station, Access Point Base Station, base station router, or any other network unit capable to communicate with the user equipment 10 within the cell served by the radio network node 12 depending e.g. of the radio access technology and terminology used. The radio network node 12 may be represented by a radio base station, a relay node, or a beacon station.

The user equipment 10 transmits a signal carrying SRS to be used for estimating channel gain at the radio network node 12. Except from SRS, an uplink sub-frame may also comprise a Demodulation Reference Signal (DMRS) for a Physical Uplink Shared Channel (PUSCH). DMRS and data on the PUSCH are always transmitted together and on the same frequency band in each uplink transmission. The DMRS is a reference signal that is known to the system, and the DMRS may therefore be used for estimating the properties of the radio-channel, also referred to as channel estimation. The estimated channel may then be used for demodulating received data symbols on the PUSCH, steps referred to as equalization and channel decoding.

Embodiments herein solves the problems mentioned above by adding DMRS measurements for channel gain estimation as well as SRS measurements thus increasing the effective rate at which the channel gain vector is updated, in both time and frequency domain. Thereby, a better tracking of the varying channel is allowed and a noise reduction of the channel gain estimates is achieved as the number of SRS for the user equipment may be reduced. Thus, the radio network node 12 estimates the channel gain, referred to herein as a third channel gain, of the channel based on channel gain measurement or measurements of SRS, also referred to as measured first channel gain, and channel gain measurement or measurements of DMRS, also referred to as measured second channel gain. The first channel gain is measured over a first set of frequencies and the second channel gain is measured over a second set of frequencies. The third channel gain is then estimated over a total bandwidth or a part of the total bandwidth covering the first set and second set of frequencies but also other frequencies.

Figure 2:
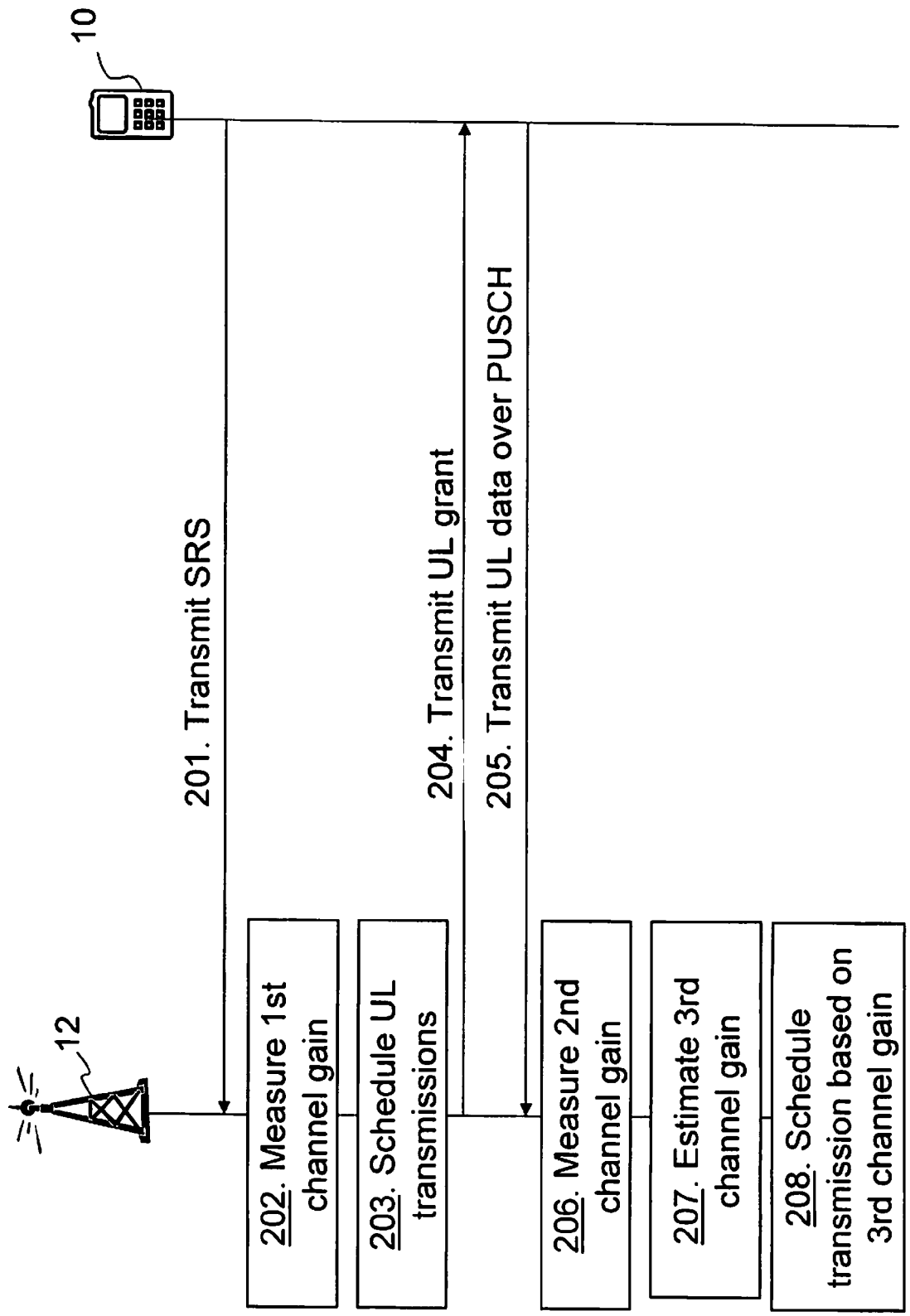
FIG. 2 is a schematic combined flowchart and signaling scheme depicting embodiments disclosed herein.

FIG. 2 is a combined flowchart and signaling scheme depicting embodiments herein. The actions may be performed in any suitable order.

Action 201.

The user equipment 10 transmits, periodically, a SRS to the radio network node 12 according to configured settings in the user equipment 10. The user equipment 10 may be configured via Radio Resource Signaling by the radio network node 12.

Action 202.

The radio network node 12 measures a first channel gain of the received SRS. Channel gain is measured by measuring received signal power given the transmit power, and depends on pathloss, antenna gain and feeder loss etc.

Action 203.

The radio network node 12 may schedule resources for UL transmissions from the user equipment 10 being requested by the user equipment 10. E.g. the radio network node 12 may perform FSS based on the first channel gain measurement, thus, the first channel gain measurement may be used by the scheduler in the radio network node 12 by giving it a first rough estimate of where to schedule transmission for the user equipment 10.

Action 204.

The radio network node 12 then transmits, to the user equipment 10, an UL grant indicating the scheduled resources for the user equipment 10 to transmit UL data on.

Action 205.

The user equipment 10 may then transmit the UL data on the scheduled resources, indicted in the UL grant, on the PUSCH. The PUSCH carries DMRS to enable demodulation of the UL data on the PUSCH.

Action 206.

The radio network node 12 measures a second channel gain of the received DMRS. That is, the radio network node 12 measures a received power of the received DMRS of the PUSCH frequencies scheduled for the UL data.

Action 207.

According to embodiments herein the radio network node 12 estimates the third channel gain of the channel to the user equipment 10 by measuring received power of both received SRS and received DMRS. Thus, based on the first and second measured channel gains the radio network node 12 estimates the third channel gain of frequencies of a bandwidth of the radio communications network 1. The frequencies of the bandwidth cover the frequencies of the received SRS and the received DMRS but also frequencies outside the frequencies of the received SRS and the received DMRS. It should be noted that the radio network node 12 may measure a number of first channel gains of SRSs and measure a number of second channel gains of DMRSs to establish a curve defining the third channel gain covering a total bandwidth or a part of the total bandwidth of the radio communications network 1. It should further be understood that some embodiments herein, as shown in FIG. 2, may use channel gain measurements of SRS as to get a rough picture of how the channel gain for frequency selectivity is of the channel over the total bandwidth. The PUSCH based measurements, i.e. the second channel gain measurement on the DMRS, may then be used to refine the third channel gain estimation over those frequencies where PUSCH is scheduled, e.g. on fading peaks. By using channel gain measurements on SRSs, the first channel gain measurements are performed over the total bandwidth of the radio communications network 1 and at regular intervals. The second channel gain measurements are performed at the frequencies that were selected by the scheduler of the radio network node 12 for scheduling UL data for the user equipment 10. In other words, the SRS measurements may be used to schedule UL data from the user equipment 10 initially and DMRS measurements may then be used to tune the scheduling.

Action 208.

The radio network node 12 may then use the estimated third channel gain to schedule further UL data for the user equipment 10. The radio network node 12 may e.g. use the third channel gain over the frequencies of the user equipment 10 and compare it to an estimated third channel gain over the frequencies of a second user equipment to perform a FSS or FSLA.

Figure 3:
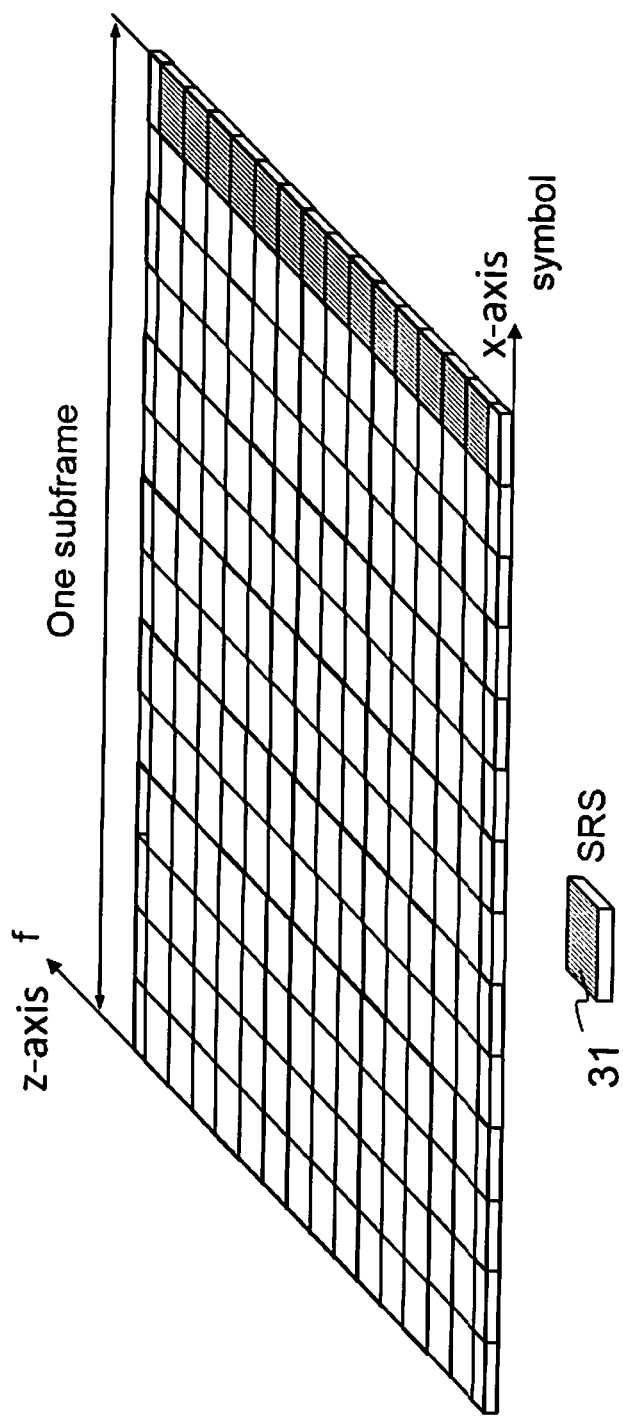
FIG. 3 is a block diagram depicting a subframe in the radio communications network.

SRS may be configured to be transmitted in a single transmission over the total system bandwidth as shown in FIG. 3, wherein a SRS resource element 31 is denoted as striped resource element. The SRS may also be split into several, more narrow band SRS transmissions. The total system bandwidth is then covered through the utilization of frequency hopping.

Figure 4:
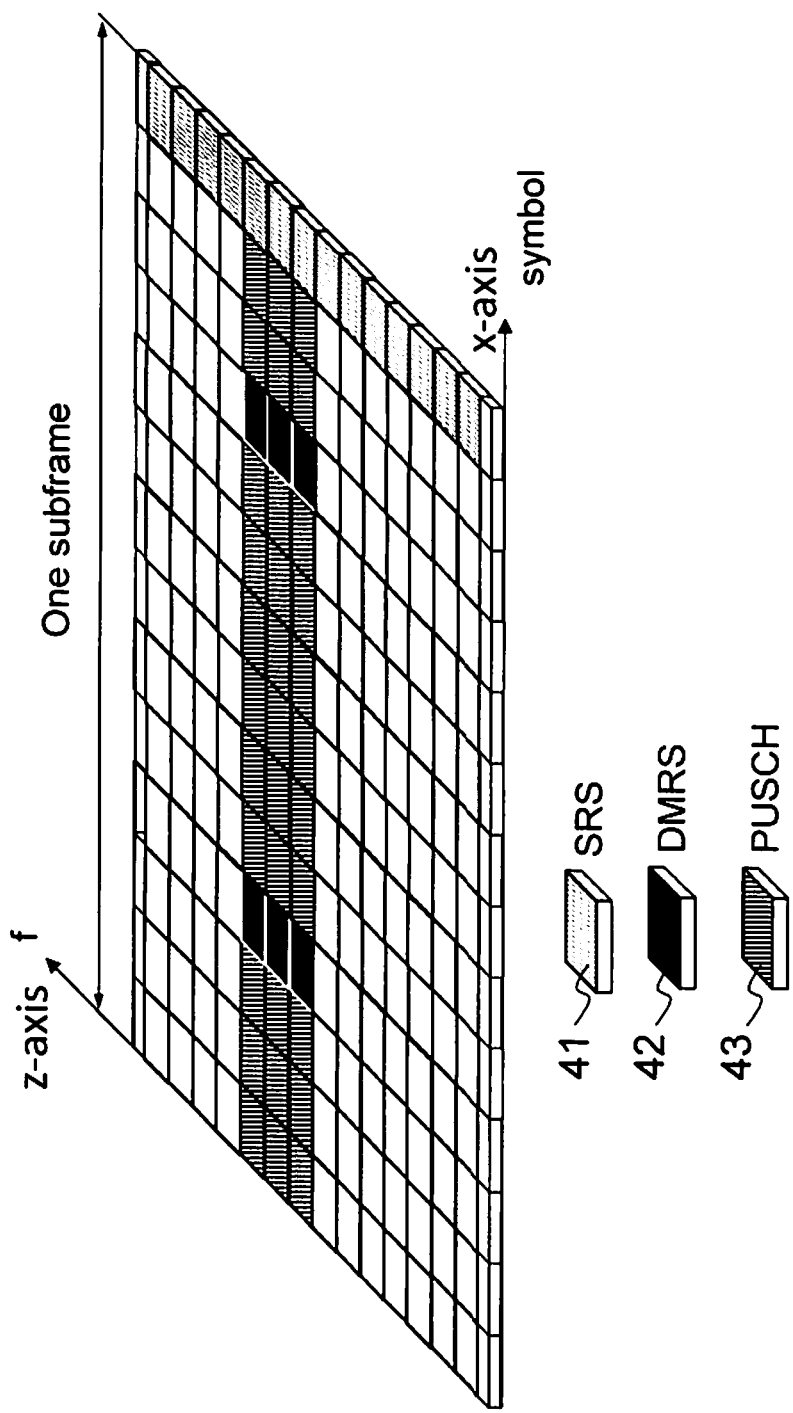
FIG. 4 is a block diagram depicting a subframe wherein the SRS is transmitted together with DMRS.

As shown in FIG. 4, the SRS may be transmitted together with DMRS and PUSCH in the same subframe. The bandwidth of the SRS is independent of the bandwidth of the PUSCH. While PUSCH and DMRS are transmitted irregularly according to the uplink grants given by a scheduler in the radio network node 12, SRS is transmitted at regular and pre-configured transmission time intervals from the user equipment 10. The transmission time intervals are configured per user equipment and may be set to a periodicity of 2, 5, 10, 20, 40, 80, 160 and 320 ms. According to embodiments herein the SRS and the DMRS are used to estimate the channel gain of the channel to the user equipment 10. An SRS resource element 41 is indicated as a striped resource element, an DMRS resource element 42 is indicated as a black resource element, and other PUSCH resource elements 43 are indicated as diagonal striped.

Figure 5:
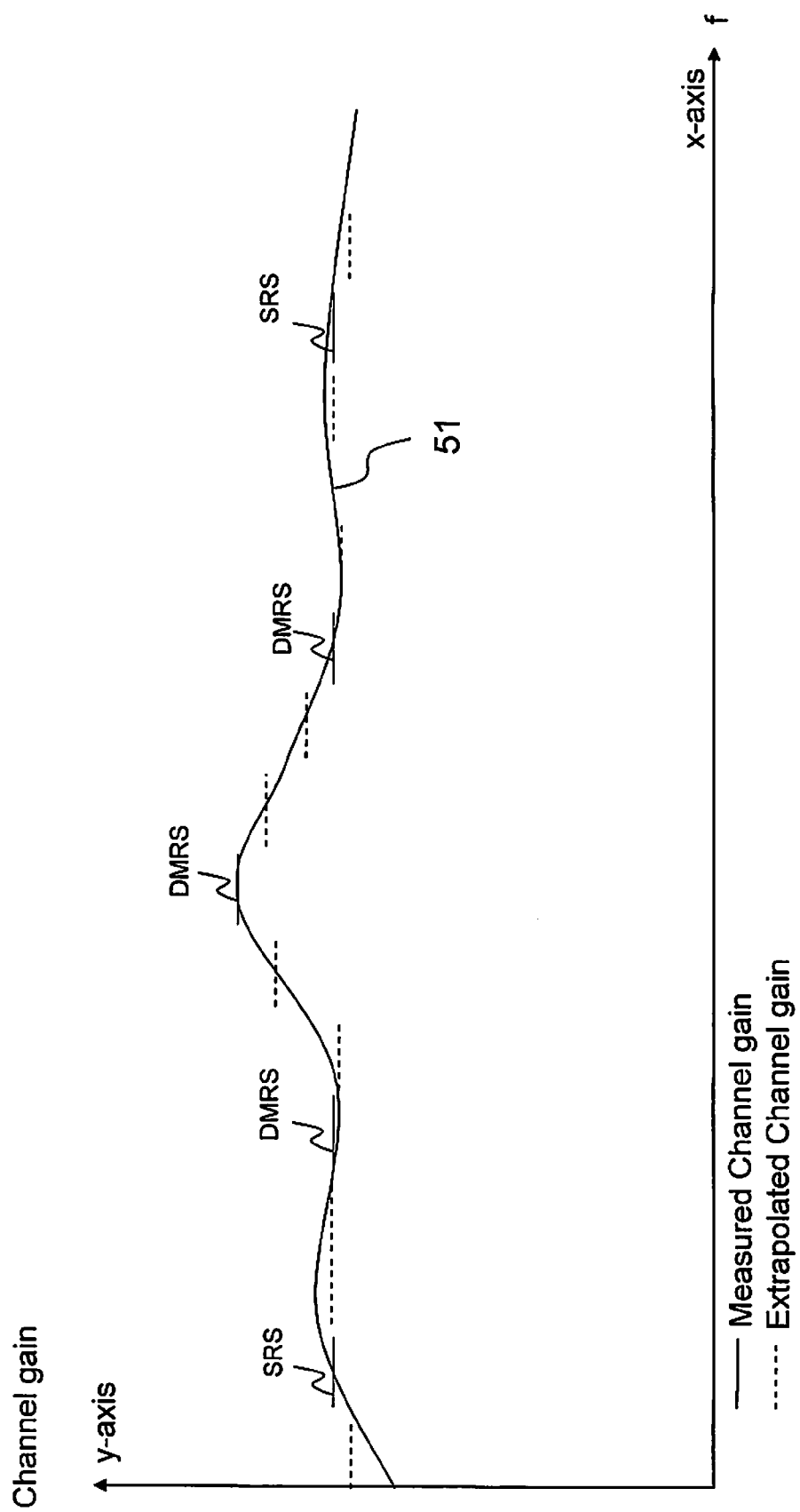
FIG. 5 is a schematic graph depicting an estimate of the third channel gain according to some embodiments herein.

FIG. 5 is a graph depicting a channel gain estimation based on both SRS and DMRS measurements. True channel gain is depicted in the graph by a true curve 51. The graph illustrates a number of SRS measurements and DMRS measurements that have been extrapolated, dashed lines, to form the estimated third channel gain over the whole bandwidth. Some embodiments may comprise two major parts: A first part that comprises a time domain filtering and a frequency domain extrapolation. The time domain filtering has a smoothening effect which helps to remove measurement noise, while the frequency domain extrapolation part exploits correlations in the frequency domain, where a measurement in one Physical Resource Block (PRB) also give some information about the neighbouring PRBs. When a new channel gain measurement of a received transmission the channel gain vector is updated over those frequencies over which the received transmissions was made. Furthermore frequencies outside of the received transmission may also be updated, this is what is referred to as "frequency domain extrapolation". The frequency domain extrapolation is constructed in such way that the new channel gain measurement has much impact at frequencies that are close to the new channel gain measurement, while frequencies further away from the channel gain measurement are almost unaffected by the new measurement. The frequency domain extrapolation may further be constructed taking into account time that has passed since the last channel gain measurement was made on that frequency, giving more weight to more recent channel gain measurements.

Figure 6:
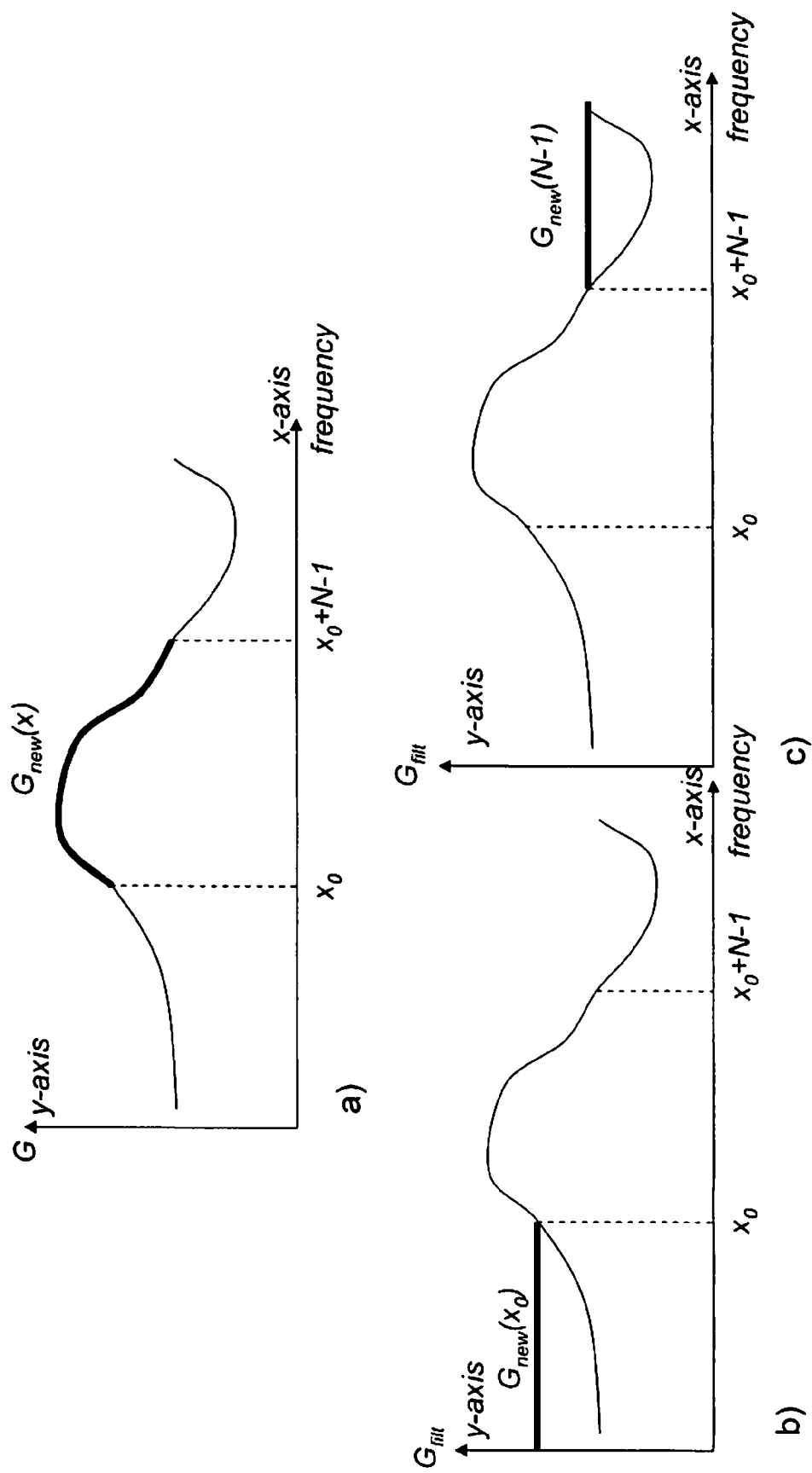
FIGS. 6a-6c are schematic graphs illustrating measured and estimated channel gains over frequencies according to embodiments herein.

FIGS. 6a-6c are each a schematic graph illustrating a measured channel gain, e.g. a first or second channel gain, over a first set of frequencies or a second set of frequencies and the frequency domain extrapolation of such a channel gain measurement.

FIG. 6a depicts a graph wherein channel gain G is defined along a y-axis and a frequency is defined along an x-axis. Embodiments herein may use the following channel measurements: Channel gain measurements based on SRS and channel gain measurements based on DMRS on PUSCH. Each gain measurement report is in a form of a vector covering the first set of frequencies in case of SRS or the second set of frequencies in case of DMRS, and each element in the vector corresponds to a signal power measured at a specific subcarrier or a group of subcarriers, for example one PRB. A physical starting point in the frequency domain and a length of the measurement vector in number of frequency bins is also given as an input.

Each element of a new channel gain measurement report is filtered through an recursive filter by being calculated in a formula according to $$G_{filt}(x)=(1-\beta(x))\cdot \tilde{G}_{filt}(x)+\beta(x)\cdot G_{new}(x-x_0), x_0 \le x \le x_0+N-1$$

$G_{filt}$ is a filtered gain vector and holds the current state of the estimated channel gain respectively for each frequency x within the total system bandwidth.

A variable $\beta(x)$ is a weighting factor may also be referred to as a forgetting factor that may be both time and frequency dependent.

$\tilde{G}_{filt}$ is a filtered channel gain vector and holds a previous state of the estimated channel gain respectively for each frequency x within the total system bandwidth.

$G_{new}$ is a new SRS or DMRS based channel gain measurement report vector. The element indices of the channel gain measurement report vector and is going from 0 to N-1, where N-1 is a length of the vector.

Variable $x_0$ is an index in $G_{filt}$ that correspond to index x=0 in the channel gain measurement report vector $G_{new}$, also referred to as initial frequency, $G_{new}(x)$ is used to update $G_{filt}(x)$ over frequencies $x_0 \le x \le x_0+N-1$ FIG. 6b depicts a graph wherein channel gain G is defined along a y-axis and a frequency is defined along an x-axis. The filtered gain vector $G_{filt}(x)$ is also updated for those elements that are outside to the left of the new channel gain measurement report.

$$G_{filt}(x)=(1-\beta(x))\cdot \tilde{G}_{filt}(x)+\beta(x)\cdot G_{new}(x_0), x<x_0$$

$G_{new}(x_0)$ is used to update $G_{filt}(x)$ over frequencies $x<x_0$.
Parameters are defined above in reference to FIG. 6a.

FIG. 6c depicts a graph wherein channel gain G is defined along a y-axis and a frequency is defined along an x-axis. The filtered gain vector $G_{filt}(x)$ is also updated for those elements that are outside to the right of the new measurement report.

$$G_{filt}(x)=(1-\beta(x))\cdot \tilde{G}_{filt}(x)+\beta(x)\cdot G_{new}(N-1), x>x_0+N-1$$

$G_{new}(N-1)$ is used to update $G_{filt}(x)$ over frequencies $x>x_0+N-1$
Parameters are defined above in reference to FIG. 6a.

Figure 7:
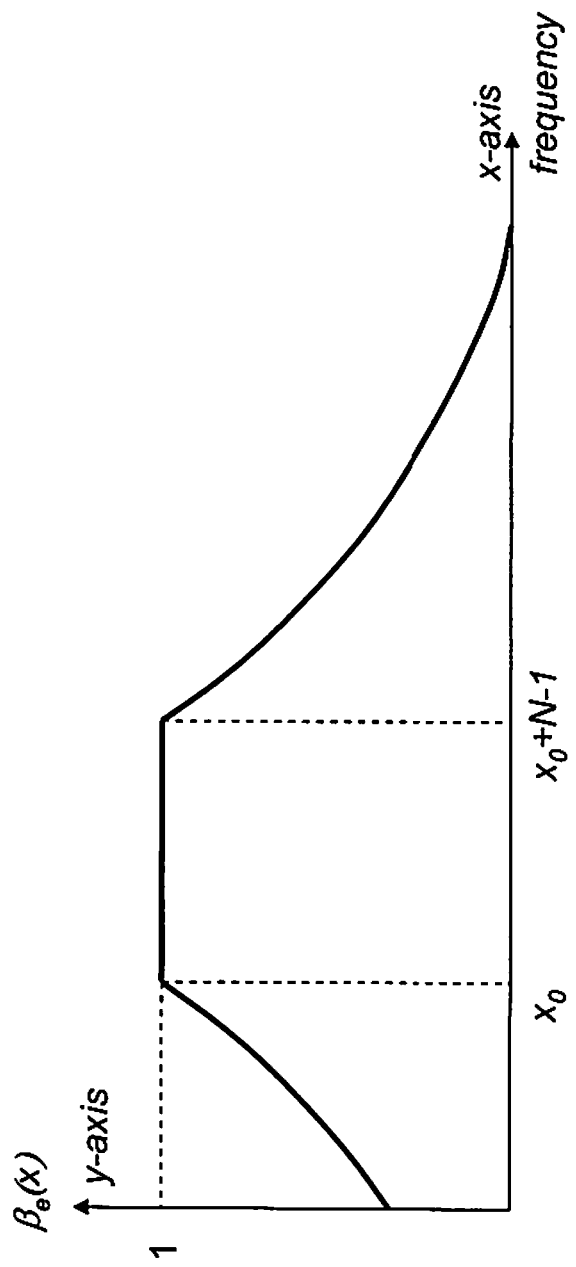
FIG. 7 is a graph illustrating a first part of a weighting factor over frequencies according to embodiments herein.

FIG. 7 depicts a schematic graph wherein a first part $\beta_e(X)$ of the weighting factor $\beta(x)$ is defined along a y-axis and a frequency is defined along an x-axis. The variable $\beta(x)$ is the weighting factor that may be both time and frequency dependent. The weighting factor may comprise two parts. The first part $\beta_e(x)$ is purely frequency dependent and is responsible for controlling the amount of influence a new channel gain measurement has on the neighbouring frequencies, i.e. at frequencies in the range $x<x_0$ and $x>x_0+N-1$. A second part $\beta_c(x)$ is both time and frequency dependent and controls how much influence a new channel gain measurement has over a corresponding previous channel gain measurement of the frequencies in a filter memory. The first part $\beta_e(x)$ of the weighting factor, named, is set to one at those frequencies in the $G_{filt}$ domain that are corresponding to the new channel gain measurement, i.e. $x_0 \ge x \ge x_0+N-1$. For frequencies outside of the new channel gain measurement, i.e., $x<x_0$ or $x>x_0+N-1$, the weighting factor $\beta_e(x)$ is to decrease towards zero as a distance to an edge of the channel gain measurement increases as illustrated in FIG. 7. There are an infinite number of possible form functions for $\beta_e(x)$. One realization of such a form function is:

$$\beta_e(x) = \begin{cases} e^{-A|x-x_0|} & x < x_0 \\ 1 & x_0 \le x \le x_0+N-1 \\ e^{-A|x-(x_0+N-1)|} & x > x_0+N-1 \end{cases}$$

where A is a tunable constant that may be used to tune a rate of extrapolation in the frequency domain. Different values of A may be used for DMRS and SRS respectively, thus, A may be different for first channel gain measurements and second channel gain measurements.

Figure 8:
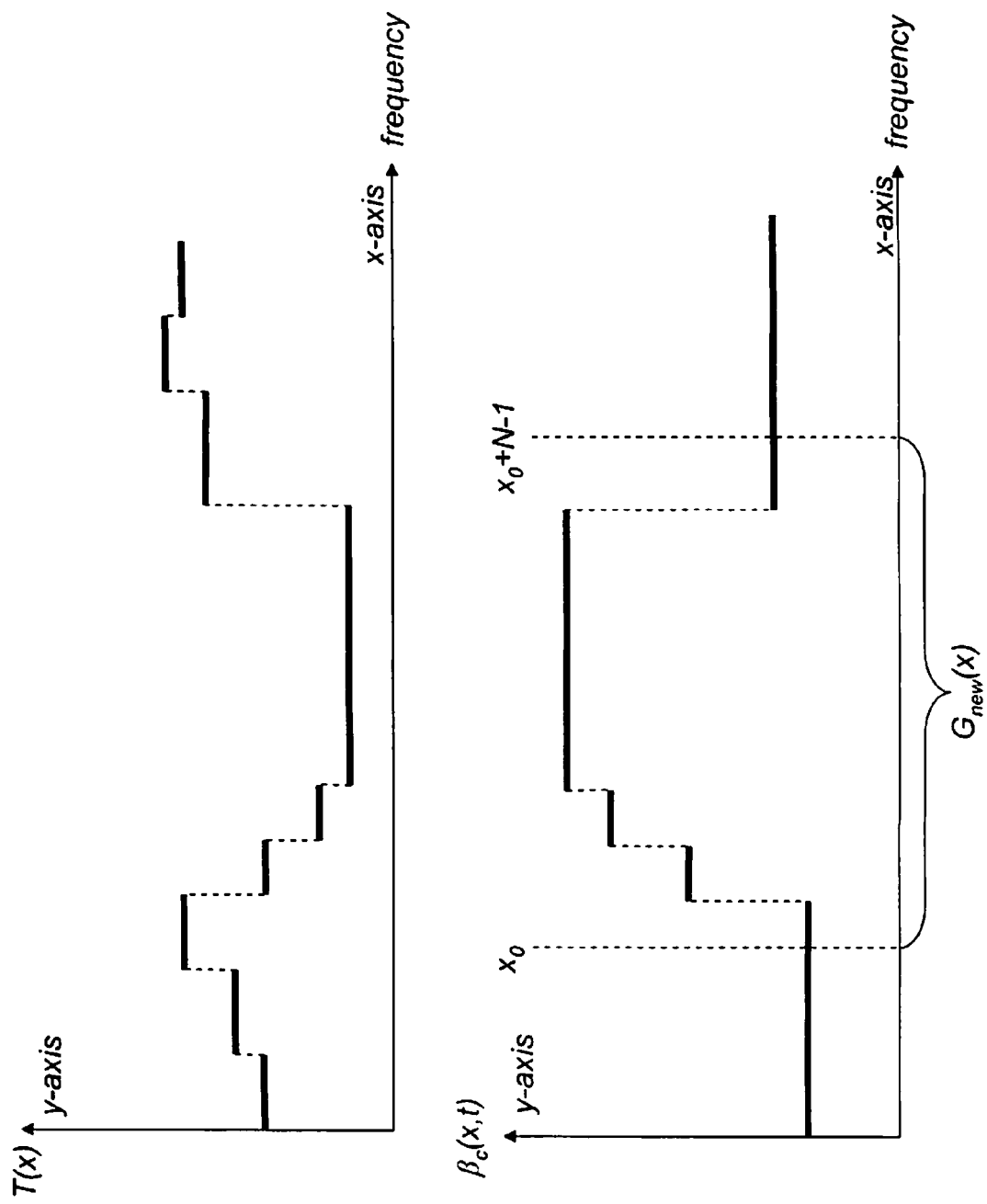
FIG. 8 is illustrating graphs relating to a second part of a weighting factor according to embodiments herein.

FIG. 8 depicts a schematic upper graph wherein a time T(x) is defined along a y-axis and a frequency is defined along an x-axis and a schematic lower graph wherein a second part $\beta_c(x)$ of the weighting factor $\beta(x)$ is defined along a y-axis and a frequency is defined along an x-axis. The second part $\beta_c(x)$ that is time and frequency dependent part of the weighting factor, has a property to give the new channel gain measurement less or more influence when updating the filter state of $G_{filt}$. An amount of influence the new channel gain measurement may have on a particular frequency depends on a time that has passed since a last channel gain measurement was made on this same frequency.

In a first method, a counter counting time, T(x), is used to keep track of how long time that has passed since a particular frequency x was updated with a new channel gain measurement. Every time a new channel gain measurement is available for a particular frequency x the current time t is stored in the counter resulting in the time T(x). when compared to previous times of channel gain measurements. The upper graph illustrates of how T(x) may be distributed after time stamps have been stored of the last received channel gain measurement for each frequency.

The lower graph illustrates how the second part $\beta_c(x)$ of weighting factor is related to the magnitude of T(x). The values $T(x_0)$ and $T(x_0+N-1)$ are used for setting weighting factor $\beta_c(x,t)$ of the frequencies below and above the allocation size corresponding to the new channel gain measurement $G_{new}(x)$. As illustrated the second part $\beta_c(x)$ is set to a high value e.g. 1 when the T(x) is low, i.e. very recent channel gain measurement was previously made.

There are an infinite number of possible form functions for the second part $\beta_c(x)$. One realization of such a form function is:

$$\beta_c(x) = \begin{cases} e^{-B|t-T(x_0)|} & x < x_0 \\ e^{-B|t-T(x)|} & x_0 \le x \le x_0+N-1 \\ e^{-B|t-T(x_0+N-1)|} & x > x_0+N-1 \end{cases}$$

where B is a tunable constant that may be used to tune a rate of forgetness. Different values of B may be used for DMRS and SRS respectively, thus, B may be different for first channel gain measurements and second channel gain measurements.

The two parts are then combined as $\beta(x)=\beta_e(x)\cdot\beta_c(x)$

It should be understood that a second method may be used to determine the second part. E.g. each channel gain measurement m is weighted based on a frequency dependent part $\beta_{e\cdot m}(x)$ and a time of the channel gain measurement $t_m$ as $$\beta_{e\cdot m}(x)\cdot e^{-B|t-t_m|}$$

at the current time t. That is, older channel gain measurements are given a lower weight since the time difference to the current time t is larger.

One may then calculate a sum of the weights of the weighting factor for all channel gain measurements:

$$\beta_{sum}(x) = \sum_{m=0}^{M-1} \beta_{e,m}(x) \cdot e^{-B|t-t_m|}$$

This sum may also be calculated recursively as $$\beta_{sum}(x)=\tilde{\beta}_{sum}(x)\cdot e^{-B|t-T|}+\beta_e(x)$$

where $\beta_{sum}(x)$ and $\tilde{\beta}_{sum}(x)$ are the current and previous state of the sum of the weights of the weighting factor and T is a time since the last channel gain measurement, which is independent of the frequency x. This is beneficial since only the current state $\beta_{sum}(x)$ need to be stored, to be used for processing a next channel gain measurement.

Now the combined weighting factor for the current measurement $\beta(x)$ is calculated as $$\beta(x) = \frac{\beta_e(x)}{\beta_{sum}(x)}$$

based on the frequency dependent part $\beta_e(x)$ and the sum of the weights $\beta_{sum}(x)$.

The benefit of this second method compared to the first method is that measurements with irregular time intervals are weighted more evenly.

Figure 9:
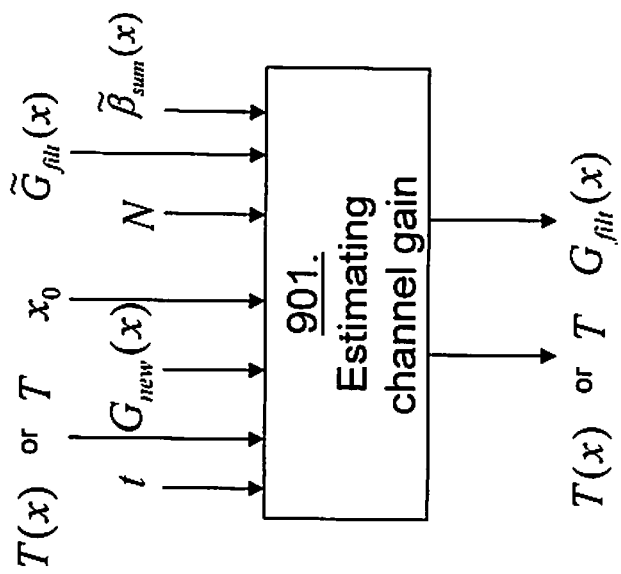
FIG. 9 is a block diagram depicting input and output parameters of some embodiments herein.

FIG. 9 is a block diagram depicting input parameters to estimate channel gain. According to some embodiments parameters that may be used and combined in an estimating of the third channel gain procedure 901 are: measured channel gain on frequency x $G_{new}(x)$, number of frequencies covering the measured channel gain N, the initial frequency $x_0$, the time that has passed since last channel gain measurement on frequency x $T(x)$, the time that has passed since the last channel gain measurement T, the filtered channel gain vector of a previous state $\tilde{G}_{filt}(x)$, the sum of the weights of the weighting factor for all channel gain measurements of a previous state of frequency x $\tilde{\beta}_{sum}(x)$, and current time t. From a combination of these inputs a filtered gain vector $G_{filt}(x)$ is obtained to extrapolate the estimated channel gain along frequencies that has not been covered in the first and second channel gain measurements, i.e. channel gain of frequencies outside the first and second set of frequencies. Also, from the current time t the time that has passed since last measurement is updated T and/or the time that has passed since last channel gain measurement on frequency x $T(x)$.

Figure 10:
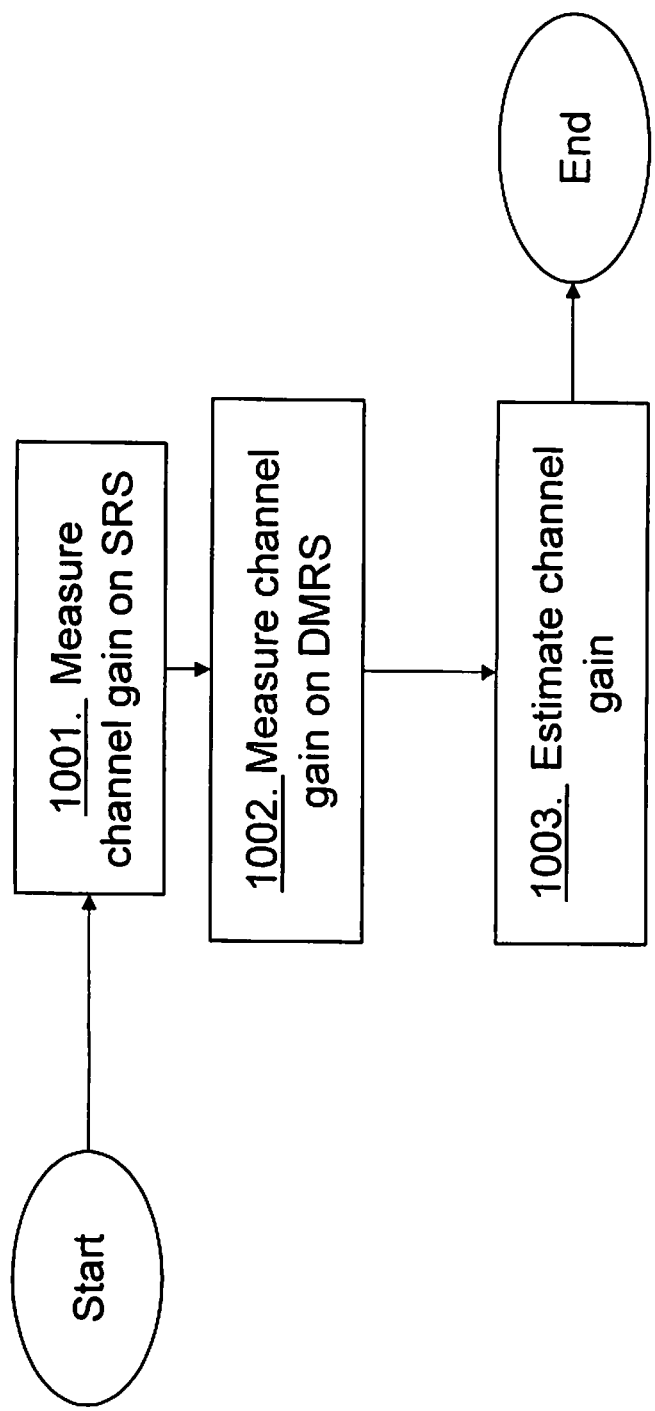
FIG. 10 is a schematic flowchart depicting a method in a radio network node according to embodiments herein.

The method steps in the radio network node 12 for estimating channel gain over frequencies of a bandwidth in the radio communications network 1 according to some general embodiments will now be described with reference to a flowchart depicted in FIG. 10. The bandwidth may be the total bandwidth or a part of the total bandwidth of the radio communications network 1. The radio network node serves the user equipment 10 in the radio communications network 1. The actions do not have to be taken in the order stated below, but may be taken in any suitable order. Actions performed only in some embodiments are marked with a dashed box.

Action 1001.

The radio network node 12 measures a first channel gain based on a received power of a SRS over a first set of frequencies from the user equipment 10. The first set of frequencies is comprised in the frequencies of the bandwidth.

Action 1002.

The radio network node 12 measures a second channel gain based on a received power of a received DMRS of a physical uplink shared channel over a second set of frequencies from the user equipment 10. The second set of frequencies is comprised in the frequencies of the bandwidth.

Action 1003.

The radio network node 12 estimates a third channel gain over the frequencies of the bandwidth based on the measured first channel gain and the measured second channel gain. In some embodiments the estimating comprises extrapolating the first channel gain and the second channel gain to cover frequencies outside the first set of frequencies and the second set of frequencies. The extrapolated first channel gain may then in its turn be calculated in a formula taking into account a first weighting factor resulting in a first filtered channel gain of frequencies outside the first set of frequencies. Similarly, the extrapolated second channel gain may be calculated in a formula taking into account a second weighting factor resulting in a second filtered channel gain of frequencies outside the second set of frequencies.

Each new frequency selective gain measurement, regardless of if it is based on DMRS or SRS, may be filtered through the described filtering procedure. If two or more measurements are made in a same Time Transmission Interval (TTI), then both these measurements may be filtered in sequence, beginning with the DMRS based measurement. The SRS based measurements are filtered last.

The method benefits in that the channel gain measurements are made at regular intervals and that the channel gain measurements cover the whole system bandwidth. Otherwise frequency selective scheduling will not work since part of the frequency band may have missing or outdated measurements. SRS will provide gain measurements that have this property since they are transmitted at regular time intervals and over all different parts of the system bandwidth.

Embodiments herein complement the measured first channel gain or gains, also referred to as SRS based measurements, with the measured second channel gain or gains, also referred to as on DMRS based measurements. The benefit of using the DMRS based measurements is that the DMRS based measurement will improve and complement the SRS based measurements over those frequencies that were allocated for transmission of PUSCH data by the scheduler of the radio network node 12. If the user equipment 10 that has a lot of data to transmit, PUSCH with DMRS will be transmitted frequently, maybe as often as in every TTI. This way of complementing the first channel gain or gains with the second channel gain or gains makes it possible to follow a fading of the radio channel in both the time and frequency domain over those frequencies where the user is currently allocated. It should be noted that it is possible to transmit SRS as frequently as every second subframe, but this will then come at the price of a reduced capacity in terms of the number of users that can have SRS.

In some embodiments, the first weighting factor is dependent on a closeness in frequency to the first set of frequencies and/or the second weighting factor is dependent on a closeness in frequency to the second set of frequencies. Closeness herein means how adjacent in frequency a calculated frequency of the extrapolated frequency is the measured frequencies; distance in frequency to the measured frequencies, or proximity to the first or second set of frequencies. This part of the weighting factor is referred herein as the first part $\beta_e(x)$ which is a part that is a purely frequency dependent part of the weighting factor. As stated above there are an infinite number of possible form functions for the first part $\beta_e(x)$. One realization of such a form function is:

$$\beta_e(x) = \begin{cases} e^{-A|x-x_0|} & x < x_0 \\ 1 & x_0 \le x \le x_0 + N - 1 \\ e^{-A|x-(x_0+N-1)|} & x > x_0 + N - 1 \end{cases}$$

where A is a tunable constant that can be used to tune the rate of extrapolation in the frequency domain. Different values of A may be used for DMRS and SRS respectively.

In some embodiments the first and/or the second weighting factor is dependent on a time that has passed since a previous channel gain measurement. This second part of the weighting factor that is a time (and frequency) dependent part of the weighting factor is denoted $\beta_c(x)$. The second part $\beta_c(x)$ has the property to give a new channel gain measurement less or more influence. The amount of influence a new channel gain measurement will have on a particular frequency depends on the time that has passed since the last measurement was made on this same frequency.

There are an infinite number of possible form functions for the second part $\beta_c(x)$. One realization of such a form function is:

$$\beta_c(x) = \begin{cases} e^{-B|t-T(x_0)|} & x < x_0 \\ e^{-B|t-T(x)|} & x_0 \le x \le x_0 + N - 1 \\ e^{-B|t-T(x_0+N-1)|} & x > x_0 + N - 1 \end{cases}$$

B is a tunable constant that can be used to tune the rate of forgetness. Different values of B may be used for DMRS and SRS respectively.

The two parts of the weighting factor may then be combined as $\beta(x)=\beta_e(x) \cdot \beta_c(x)$ to calculate the first and/or the second weighting factors. The first and second weighting factors may further be calculated with the second method mentioned in FIG. 8. The benefit of this second method compared to the first method is that channel gain measurements with irregular time intervals are weighted more evenly.

In some embodiments the estimated third channel gain is to be used for FSS or FSLA. If information about the frequency selectivity is available for every user equipment that the scheduler in the radio network node 12 is serving it possible to assign the user equipments to the part of the spectrum that benefits them most. This is a strategy called FSS. The third channel gain, combined with noise and interference measurements, may be converted into an equivalent channel quality measurement and e.g. two user equipments that are sharing a common bandwidth are each assigned to those frequencies that maximizes their channel quality. Also, as the channel gain is more accurate over the bandwidth the link adaptation is also more accurate and results in better performance of the radio communications network 1.

In some embodiments, when the SRS bandwidth is large, or above a threshold, then the frequency domain extrapolation becomes less important. The measured first and second channel gains may then merely be time dependent filtered taking only the time of previously measured channel gains into account to estimate the third channel gain.

Embodiments herein describe using two different techniques, SRS and DMRS based measurements, that when combined significantly improves the quality of the estimated third channel gain, thereby improving the performance of the frequency selective scheduler and the spectral efficiency of the system.

Figure 11:
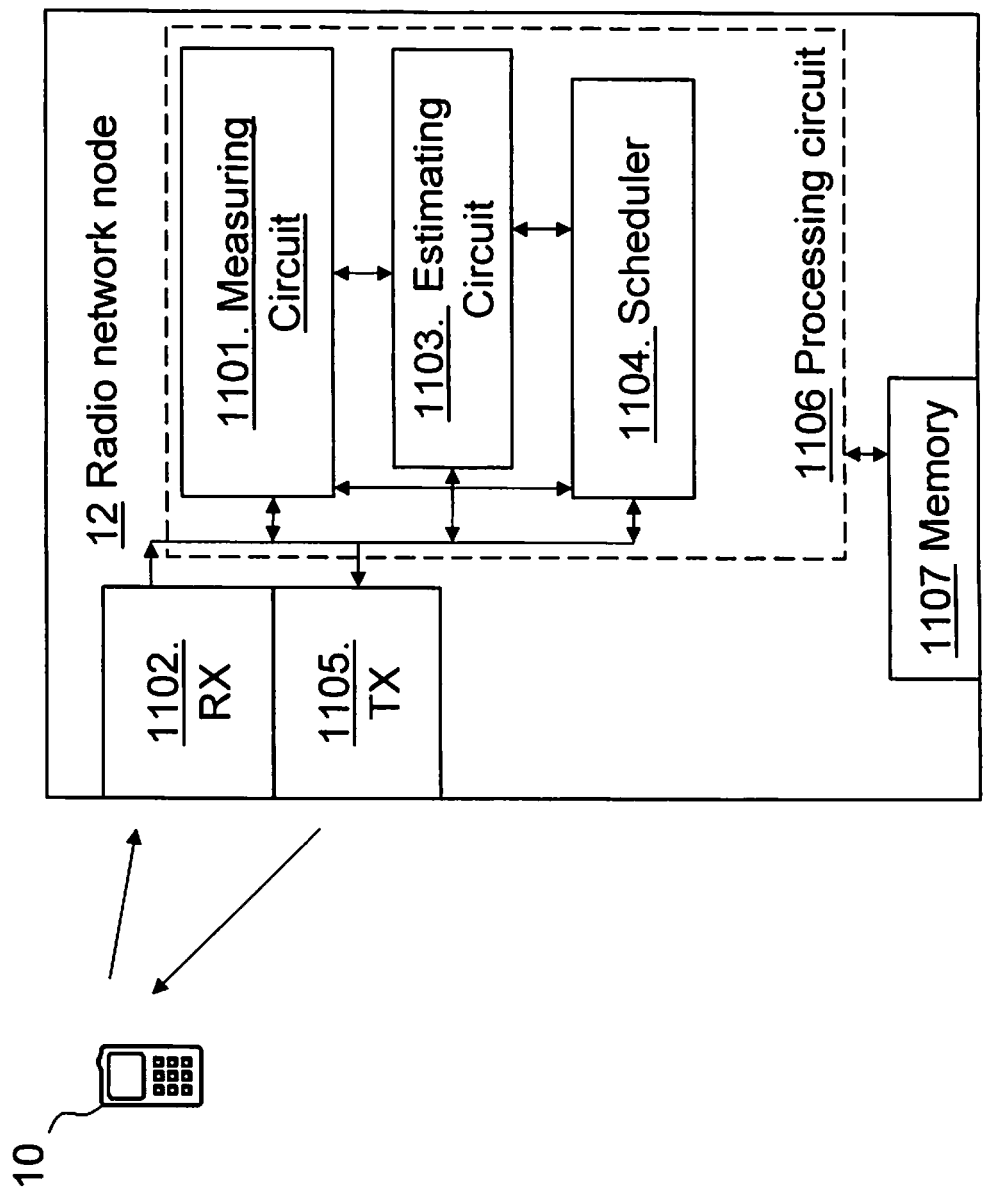
FIG. 11 is a block diagram depicting a radio network node according to embodiments herein.

FIG. 11 is a block diagram depicting the radio network node 12 for estimating channel gain over frequencies of the bandwidth in the radio communications network 1. As stated above the radio network node 12 is arranged to serve a user equipment 10 in the radio communications network 1.

The radio network node 12 comprises a measuring circuit 1101 configured to measure a first channel gain based on a received power of a SRS over a first set of frequencies from the user equipment 10. The measuring circuit 1101 is further configured to measure a second channel gain based on a received power of a received DMRS of a PUSCH over a second set of frequencies from the user equipment 10. The first set of frequencies and second set of frequencies are comprised in the frequencies of the bandwidth. The SRS and DMRS are received over a receiver RX 1102 comprised in the radio network node 12.

The radio network node 12 further comprises an estimating circuit 1103 configured to estimate a third channel gain over the frequencies of the bandwidth based on the measured first channel gain and the measured second channel gain. The estimating circuit 1103 is in some embodiments configured to extrapolate the first channel gain and the second channel gain to cover frequencies outside the first set of frequencies and the second set of frequencies. Thus, the bandwidth covers frequencies outside the measured first and second set of frequencies. The estimating circuit 1103 may further be further configured to filter the extrapolated first channel gain in a formula taking a first weighting factor into account resulting in a first filtered channel gain of frequencies outside the first set of frequencies. Additionally or alternatively, the estimating circuit 1103 may further be configured to filter the extrapolated second channel gain in a formula taking a second weighting factor resulting in a second filtered channel gain of frequencies outside the second set of frequencies.

In some embodiments is the first weighting factor dependent on a closeness in frequency to the first set of frequencies and/or the second weighting factor is dependent on a closeness in frequency to the second set of frequencies. The first and/or the second weighting factor may be dependent on a time that has passed since a previous channel gain measurement. The measured first and second channel gains may merely be time dependent filtered taking only the time of previously measured channel gains into account to estimate the third channel gain According to some embodiments the estimated third channel gain is to be used for Frequency Selective Scheduling or Frequency Selective Link Adaptation.

It should be understood that the radio network node 12 comprises a scheduler 1104 that may be configured to use the estimated third channel gain of the user equipment 10 and compare it with estimated third channel gains of other user equipments to determine which of the user equipments benefits scheduling transmissions over certain frequencies.

The embodiments herein for estimating channel gain over frequencies of the bandwidth in the radio communications network may be implemented through one or more processors, such as a processing circuit 1105 in the radio network node 12 depicted in FIG. 11, together with computer program code for performing the functions and/or method steps of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Furthermore, the radio network node 12 comprises a memory 1106 that may be used to store data on such as estimated and measured channel gains, scheduling information, frequencies, parameter values to be used when estimating the third channel gain, applications to perform the methods herein when being executed on the radio network node 12 and similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a radio network node for estimating channel gain over frequencies of a bandwidth in a radio communications network, which radio network node serves a user equipment in the radio communications network, the method comprising:
   measuring a first channel gain based on a received power of a sounding reference signal over a first set of frequencies from the user equipment, which first set of frequencies is comprised in the frequencies of the bandwidth;
   measuring a second channel gain based on a received power of a received demodulation reference signal of a physical uplink shared channel over a second set of frequencies from the user equipment, which second set of frequencies is comprised in the frequencies of the bandwidth; and
   estimating a third channel gain, for Frequency Selective Scheduling or Frequency Selective Link Adaptation, over the frequencies of the bandwidth based on the measured first channel gain and the measured second channel gain,
   wherein the estimating comprises extrapolating the first channel gain and the second channel gain to cover frequencies outside the first set of frequencies and the second set of frequencies.

2. The method according to claim 1, wherein the extrapolated first channel gain is calculated in a formula taking into account a first weighting factor resulting in a first filtered channel gain of frequencies outside the first set of frequencies.

3. The method according to claim 2, wherein the extrapolated second channel gain is calculated in the formula taking into account a second weighting factor resulting in a second filtered channel gain of frequencies outside the second set of frequencies.

4. The method according to claim 3, wherein the first weighting factor is dependent on a closeness in frequency to the first set of frequencies and/or the second weighting factor is dependent on a closeness in frequency to the second set of frequencies.

5. The method according to claim 3, wherein the first and/or the second weighting factor is dependent on a time that has passed since a previous channel gain measurement.

6. The method according to claim 1, wherein the measured first and second channel gains are time dependent filtered taking only a time of previously measured channel gains into account to estimate the third channel gain.

7. A radio network node for estimating channel gain over frequencies of a bandwidth in a radio communications network, which radio network node is arranged to serve a user equipment in the radio communications network, the radio network node comprising:
   a measuring circuit configured to measure a first channel gain based on a received power of a sounding reference signal over a first set of frequencies from the user equipment, and to measure a second channel gain based on a received power of a received demodulation reference signal of a physical uplink shared channel over a second set of frequencies from the user equipment, which first set of frequencies and second set of frequencies are comprised in the frequencies of the bandwidth, and
   an estimating circuit configured to estimate a third channel gain, for Frequency Selective Scheduling or Frequency Selective Link Adaptation, over the frequencies of the bandwidth based on the measured first channel gain and the measured second channel gain,
   wherein the estimating circuit is configured to extrapolate the first channel gain and the second channel gain to cover frequencies outside the first set of frequencies and the second set of frequencies.

8. The radio network node according to claim 7, wherein the estimating circuit is further configured to filter the extrapolated first channel gain in a formula taking a first weighting factor into account resulting in a first filtered channel gain of frequencies outside the first set of frequencies.

9. The radio network node according to claim 8, wherein the estimating circuit is further configured to filter the extrapolated second channel gain in the formula taking a second weighting factor resulting in a second filtered channel gain of frequencies outside the second set of frequencies.

10. The radio network node according to claim 9, wherein the first weighting factor is dependent on a closeness in frequency to the first set of frequencies and/or the second weighting factor is dependent on a closeness in frequency to the second set of frequencies.

11. The radio network node according to claim 9, wherein the first and/or the second weighting factor is dependent on a time that has passed since a previous channel gain measurement.

12. The radio network node according to according to claim 7, wherein the measured first and second channel gains are time dependent filtered taking only a time of previously measured channel gains into account to estimate the third channel gain.

\* \* \* \* \*